F. C. BINKLEY.
GASOLENE HEATED APPLIANCE.
APPLICATION FILED SEPT. 29, 1911.
1,014,113.
Patented Jan. 9, 1912.
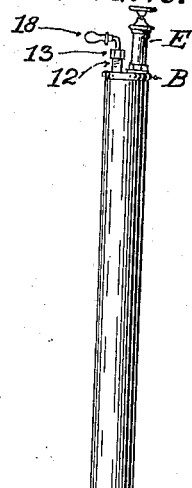
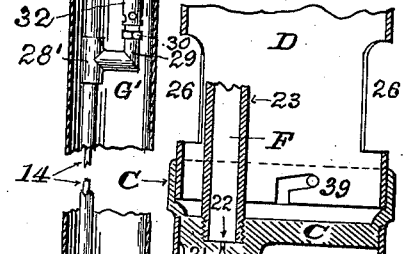
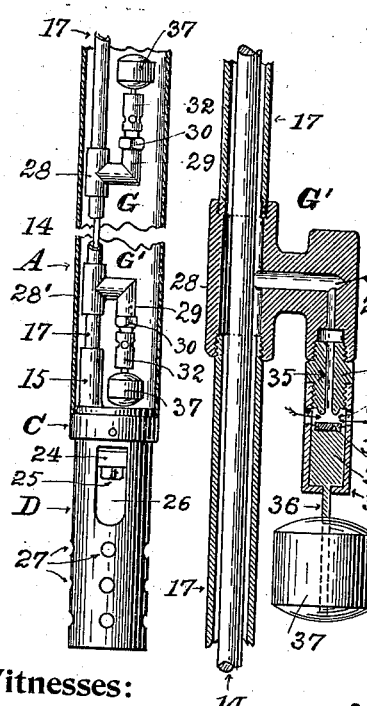
Witnesses:
Jas E. Barkley
A. S. Peterson
Inventor:
FRANK C. BINKLEY,
By Michael J. Stark & Sons
Attorneys

UNITED STATES PATENT OFFICE.

FRANK C. BINKLEY, OF SYCAMORE, ILLINOIS.

GASOLENE-HEATED APPLIANCE.

1,014,113.   Specification of Letters Patent.   Patented Jan. 9, 1912.

Application filed September 29, 1911. Serial No. 651,965.

*To all whom it may concern:*

Be it known that I, FRANK C. BINKLEY, a citizen of the United States, and resident of Sycamore, in Dekalb county, State of Illinois, have invented certain new and useful Improvements in Gasolene-Heated Appliances; and I do hereby declare that the following description of my said invention, taken in connection with the accompanying sheet of drawings, forms a full, clear, and exact specification, which will enable others skilled in the art to which my said invention appertains to make and use the same.

The object of this invention is the production of a gasolene-operated heating apparatus which is adapted for use in vertical, as well as inverted position, so that the same may be effectively employed in exterminating bugs, caterpillars, their cocoons, and other destructive insects, weeds, and other objectionable vegetable growths, for removing paint from floors, walls and ceilings, for surface-drying molds in metal foundries, and many other purposes where a gasolene torch has heretofore been employed.

Gasolene torches, as heretofore constructed, are not adapted for use in an inverted position. When a downwardly-functioning flame is desired, either a gasolene torch having a short tank capable of being employed in inverted position, or provided with a swiveled burner has been employed, or a detached burner has been attached to a flexible tube connected to a separate tank containing the liquid fuel. The latter method of using a burner is decidedly objectionable owing to the fact that most of the hydrocarbons suitable for use in a burner are solvents of rubber and, therefore subject to leakage, and thereby liable to cause serious damages. This method of providing a portable burner is objectionable when used for skin-drying molds owing to the frequent damages to molds by the rubber hose when dragged over an open mold. With a swiveled burner attached to the tank, the objections thereto are not as serious, but then, such a torch as well as all torches having a comparatively small tank, have but a limited field of usefulness, and cannot be employed for many purposes for which my improved gasolene-heated apparatus is adapted for the reason that when employed on large molding flasks in foundries, only a small portion of the flask can be reached by the flame for skin-drying.

In order to attain the advantages and results heretofore stated, I construct this apparatus of a tank including a comparatively long tube which can be held in two hands and which, being preferably about six feet in length and about two inches in diameter, will reach to the middle of probably every flask in actual use; or it will reach many branches of trees when insects are to be destroyed thereon, and the walls and ceilings of buildings and other structures for removing paint and other purposes. This heating apparatus is constructed, essentially, and in the preferred embodiment of my invention, as shown in the drawings already mentioned, in which—

Figure 1 is a view illustrating one of the uses to which this device is adapted, viz. the destroying of insects, etc. Fig. 2 is an elevation of the device drawn to approximately correct proportions of diameter and length of the tank. Fig. 3 is a longitudinal sectional elevation of the device illustrating the same in inverted position, parts being broken away for lack of space to show the full length of the tank. Fig. 4 is a similar view of a portion of the device placed in normal position. Fig. 5 is a sectional view of one of the supply-governing valves. Fig. 6 is a plan of the burner. Fig. 7 is a sectional view of a portion of the burner drawn on an increased scale and showing details of construction of the needle-valve rod. Fig. 8 is a sectional plan on line $x\ x$ of Fig. 7.

Like parts are designated by the same characters and symbols of reference in all the figures.

A, in the drawings denotes the reservoir or tank of this apparatus. This tank comprises a comparatively long tube having at one end a cap B, and at its other end a substantially cup-shaped member C, to which the burner D is removably secured.

The cap B has a sidewise located tubular projecting boss 12, externally screw-threaded at its end to receive a packing-nut 13, to afford, in conjunction with suitable packing-material in said nut, a stuffing-box for a needle-valve rod 14, to which reference will hereinafter be had. In this cap there is also an internally screw-threaded opening constructed to receive an air-compression pump E, of usual and well-known design, which opening serves as a filling opening to the tank when the air-compressing pump E is removed from the tank. The cap B and the cup-shaped member C form the ends of the tank A, they being tightly soldered or otherwise secured to the tank-tube, to afford a liquid-tight reservoir.

The cup-shaped member C has a tubular, internally screw-threaded boss 15, and the cap B has a similar boss 16, to receive between them a supply-tube 17, there being a needle-rod 14, located centrally in said supply-tube 17, the said rod having a handle 18, outside of the cap B, by which said needle-rod is rotated. The tubular boss 15 has, in addition to the screw-threaded bore, a smaller internally screw-threaded bore to receive the externally screw-threaded end 19, of said needle-rod 14, said smaller bore terminating in a conical needle-seat 20, constructed to receive the pointed end 21, of said needle-rod. A minute orifice 22, leads from this smaller bore to a generator-tube F, screwed into the cup-shaped member C. This generator F comprises a tube bent to U-shape, one limb, 23, of which is secured to said cup-shaped member, while the other limb has at its end a fitting 24, provided with a so-called jet nozzle 25, said jet nozzle being a nipple screwed into the fitting 24 and provided with a minute escape opening of usual construction. This generator F is surrounded by a tube D, there being in this tube adjacent to the cup-shaped member C, openings 26, and a series of smaller openings 27, to admit air to the interior of the tube D. In order that this burner may be used in either vertically upward, inclined, or vertically downward position, there are located in the tank A, and connected to the burner supply pipe 16, at or near the ends of the tank, automatically-operating inlet-valves G, G', so constructed that one inlet to the supply-pipe 17 will be closed when the other is open. These valves are identical in construction, so that a description of one, will also apply to the other of these valves. Thus, in the supply-pipe 17, near its ends, there are connected T's 28, having sidewise projecting elbows 29, in the open end of each there is located a nipple 30, having at one end a valve-seat 31. Upon this end of the nipple there is placed a cup-shaped shell 32, forming a casing for cylindrical valve 33, which valve has a suitable valve-disk 34, adapted to engage the valve-seat 31 to close the passage 35 leading from the bore of the tube 17, and through it to the burner. The valve 33 has a stem 36, to the outer end of which there is secured a weight 37, all the details of this valve being clearly illustrated in Fig. 5.

The complete valve G is located in the tank near the cap B thereof with its elbow turned toward said cap B, while the valve G', is located near the cup-shaped member C with its elbow 29 directed toward this cup-shaped member. By this construction of the valves G, G', there is always one of the valves proper in open position and the other one in closed condition, the open valve being at the lower end of the supply-pipe 17. Thus, in Fig. 3, which illustrates the "upright" position of the apparatus, the weight 37 on the then upper valve G' causes this valve 33 to be seated upon its seat 31, and thereby to close the passage 35, while the weight 37 on the lower valve G causes this valve proper 33 to drop with the weight 37 and thereby to open said passage 35, the latter valve and the open position of its parts being most clearly shown in Fig. 5.

Attention is now called to the fact that the liquid fuel in the tank A occupies the lower portion thereof, the upper portion being filled with air under pressure, which is forced into the tank by the pump E to cause the liquid fuel to rise to the burner. It, therefore, follows that in order to admit this fuel to the burner the lower inlet to the supply-pipe must be open while the upper inlet must be closed to prevent air from reaching the burner through the supply-pipe. It, furthermore follows that when the tank A is reversed or turned upside down, the condition described must also prevail, hence, in the reversed position, as illustrated in Figs. 1, 2, and 4, the valve G' will admit liquid to the burner-supply pipe 17 and the valve G will be closed to prevent air from entering the now uppermost end of the supply-pipe, so that, no matter in what position the tank may be held, the burner will always be supplied with fuel.

In order that the liquid fuel may pass the screw-threaded end 19 of the needle-rod 14 to the orifice 22, there are formed in this screw-threaded portion of the needle-rod 14 a plurality of longitudinal grooves 38, Figs. 7, and 8, which grooves afford passages for the liquid fuel in an efficient manner.

To obtain access to the generator tube and the jet 25, the tube D is removably attached to the cup-shaped member C by a so-called bayonet fastening 39, shown in Fig. 7. And in order that this tube D be properly centered upon the cup-shaped member, I locate upon the generator-tube F an annular disk or diaphragm 41, secured thereto by screws 42 or other effective means, there being centrally in this disk an opening 43, for the passage of the gas issuing from the orifice in the jet nozzle 25, said diaphragm preventing, as it does, the ignition of this gas in the lower portion of the tube D.

To operate this device, its tank is filled to approximately two-thirds of its capacity by placing the apparatus in normal vertical position as shown in Fig. 2, and the pump E removed. The pump is then replaced and operated to create the necessary air-pressure in the tank. Now the tank is inverted and the needle-valve rod 14 operated to permit liquid fuel to escape from the tank to fill the cup 40 of the member C, and this fuel is then ignited to initially heat the generator F, after which the apparatus will continue to function until the fuel supply is exhausted or shut off by manipulating the needle-valve rod 14.

This apparatus is especially useful in destroying insects upon the ground, in plants, bushes, and in trees; in exterminating weeds and other objectionable plant-growth; in foundries for skin-drying molds; in burning off paint from floors, walls and ceilings, and in fact for many purposes for which the hand torches now in general use cannot be employed.

I have illustrated in the drawings with considerable details one form of gravity-operating valves, but I desire it understood that changes in the construction of these valves may be made without departing from the scope of my invention, which broadly speaking resides in the construction of a gasolene-operated heating apparatus in which the burner which is attached to the tank, is operative when the tank is in normal as well as when in inverted position. I have also specifically described the burner which forms a part of this device, but I desire it understood that my invention does not depend for operativeness upon this particular style of burner, and that other effective burners of which there are many, may be substituted for the one shown, without departing from the scope of this invention, and finally, I desire it understood that while I have applied the gravity-operating valve devices in the present instance to a comparatively long tank rather small in diameter, the same may be readily and successfully employed in tanks of different dimensions.

Having thus fully described this invention, I claim as new and desire to secure to me by Letters Patent of the United States—

1. A gasolene-operated heating apparatus, including, in combination, a tank constructed to retain liquid fuel, said tank being a relatively long tube as compared with its diameter, closures at both ends of said tank, a burner at one end of said tank, an air compressor at the other end of said tank, a supply pipe within said tank, two elbows in screw-threaded engagement with said supply pipe one of said elbows being located near one end of said tank the other elbow being located near the other end of said tank, each elbow having a branch substantially parallel to said supply pipe, a screw-threaded nipple in said branch said nipple having a valve-seat, a casing in screw-threaded engagement with said nipple, a piston valve in said casing, a stem on said piston valve projecting from said casing, and a weight on said stem without said casing.

2. A gasolene-operated heating apparatus, including, in combination, a tank, said tank being a tube having considerable length as compared with its diameter, there being closures at each end of said tube to adapt it to retain liquid fuel, an air compressor connected to one of said closures, the other closure being cup-shaped, a burner removably secured to this cup-shaped closure by a bayonet fastening, a supply pipe in said tube connecting both of its closures, two inlet valves connected to said supply pipe one of said valves being located near one of said closures, the other valve being located near the other of said closures, and a valve rod and valve in said supply pipe constructed to open and close connection between said tank and said burner.

In testimony that I claim the foregoing as my invention, I have hereunto set my hand in the presence of two subscribing witnesses.

FRANK C. BINKLEY.

Witnesses:
 MICHAEL J. STARK,
 A. G. PETERSON.